United States Patent
Cano Wolff et al.

(10) Patent No.: US 10,830,156 B2
(45) Date of Patent: Nov. 10, 2020

(54) FUEL SUPPLY PIPELINE SYSTEM FOR GAS TURBINE

(71) Applicants: Siemens Aktiengesellschaft, Munich (DE); Mariano Cano Wolff, Ratingen (DE); Du-Fhan Choi, Duesseldorf (DE); Kai Hausmann, Muelheim (DE); Song Jun Lv, Shanghai (CN); Peter-Andreas Schneider, Muenster (DE); Julius Schwager, Dortmund (DE)

(72) Inventors: Mariano Cano Wolff, Ratingen (DE); Du-Fhan Choi, Duesseldorf (DE); Kai Hausmann, Muelheim (DE); Song Jun Lv, Shanghai (CN); Peter-Andreas Schneider, Muenster (DE); Julius Schwager, Dortmund (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 643 days.

(21) Appl. No.: 15/113,113

(22) PCT Filed: Feb. 19, 2014

(86) PCT No.: PCT/CN2014/072246
§ 371 (c)(1),
(2) Date: Jul. 21, 2016

(87) PCT Pub. No.: WO2015/123820
PCT Pub. Date: Aug. 27, 2015

(65) Prior Publication Data
US 2017/0009666 A1    Jan. 12, 2017

(51) Int. Cl.
*F02C 9/46*    (2006.01)
*F02C 7/232*    (2006.01)
(Continued)

(52) U.S. Cl.
CPC ............. *F02C 9/46* (2013.01); *F01D 21/003* (2013.01); *F02C 7/222* (2013.01); *F02C 7/228* (2013.01);
(Continued)

(58) Field of Classification Search
CPC .. F02C 7/22; F02C 7/222; F02C 7/228; F02C 7/232; F02C 9/26; F02C 9/263;
(Continued)

(56) References Cited

U.S. PATENT DOCUMENTS 2,538,582 A * 1/1951 Holliday .................. F02C 7/22
                                                                 60/39.281
2,590,838 A * 4/1952 Boggs .................... F16K 17/30
                                                                137/505.25

(Continued)

FOREIGN PATENT DOCUMENTS

CN    1171036 C    10/2004
CN    101126352 A    2/2008
(Continued)

OTHER PUBLICATIONS

Parcol, "Handbook for Sizing Control Valves", Mar. 2001. http://www.parcol.com. Accessed on Oct. 2, 2018.*
(Continued)

*Primary Examiner* — Alain Chau
(74) *Attorney, Agent, or Firm* — Harness, Dickey & Pierce, P.L.C.

(57) ABSTRACT

A fuel supply line system used for a gas turbine, including: fuel gas control valves used for controlling delivery to the gas turbine; a first line used for connecting the fuel gas source to the control valves; a second line used for connecting the control valves to the gas turbine; a monitoring device, configured to be used for determining the pressure inside the pipe at the outlet of the second line near said (Continued)

control valve; and a controller, configured to reduce the effective flow area of the pressure control valves or close the control valves when the determined pressure inside the pipe of the second line is greater than a predetermined pressure.

17 Claims, 2 Drawing Sheets

(51) Int. Cl.
    *F02C 9/26*         (2006.01)
    *F02C 7/228*       (2006.01)
    *F02C 9/28*         (2006.01)
    *F01D 21/00*      (2006.01)
    *F02C 3/04*         (2006.01)
    *F02C 7/22*         (2006.01)
    *F02C 7/264*       (2006.01)
    *F17D 1/04*         (2006.01)
    *G05D 16/20*      (2006.01)
(52) U.S. Cl.
    CPC .............. *F02C 7/232* (2013.01); *F02C 7/264* (2013.01); *F02C 9/263* (2013.01); *F02C 9/28* (2013.01); *F17D 1/04* (2013.01); *G05D 16/2013* (2013.01); *F05D 2220/32* (2013.01); *F05D 2240/35* (2013.01); *F05D 2270/3011* (2013.01); *F05D 2270/3013* (2013.01); *F05D 2270/3015* (2013.01)
(58) Field of Classification Search
    CPC ........ F02C 9/28; F02C 9/46; F05D 2270/301; F05D 2270/3011; F05D 2270/3013; F05D 2270/3015; F23K 5/002; F23K 5/005; F17D 3/01; F17D 5/005
    USPC ..... 137/505–505.47; 138/123, 124, 153, 172
    See application file for complete search history.

(56) References Cited

U.S. PATENT DOCUMENTS

| | | | | |
|---|---|---|---|---|
| 2,617,478 | A * | 11/1952 | Hildestad | F02C 7/22 239/443 |
| 2,936,028 | A * | 5/1960 | Loft | F04C 14/00 137/115.01 |
| 3,665,959 | A * | 5/1972 | Castillon | F17D 1/04 137/551 |
| 4,898,205 | A * | 2/1990 | Ross | F17C 13/04 137/505.12 |
| 5,307,620 | A * | 5/1994 | Hamahira | F02C 7/22 431/16 |
| 5,735,309 | A * | 4/1998 | Kariniemi | G05D 16/0683 137/505.46 |
| 6,112,137 | A * | 8/2000 | McCarty | F17D 1/04 137/613 |
| 6,209,310 | B1 | 4/2001 | Kuenzi et al. | |
| 6,761,032 | B2 * | 7/2004 | Moser | F02C 9/26 60/39.281 |
| 6,880,325 | B2 * | 4/2005 | Aoyama | F02C 7/228 60/39.37 |
| 7,047,747 | B2 * | 5/2006 | Tanaka | F02C 9/28 60/39.281 |
| 7,251,925 | B2 | 8/2007 | Paradise | |
| 7,644,574 | B2 * | 1/2010 | Feiz | F02C 9/28 60/39.281 |
| 8,056,317 | B2 | 11/2011 | Feiz | |
| 8,408,233 | B2 * | 4/2013 | Reuter | F02C 7/236 137/115.23 |
| 8,548,757 | B1 * | 10/2013 | Foley | G01F 1/28 702/50 |
| 9,075,414 | B2 * | 7/2015 | Takijiri | G05D 7/0617 |
| 10,317,082 | B2 * | 6/2019 | McBrien | F02C 7/228 |
| 2003/0037536 | A1 | 2/2003 | Aoyama | |
| 2003/0056514 | A1 * | 3/2003 | Lohn | F02C 3/22 60/734 |
| 2003/0093184 | A1 * | 5/2003 | Tanaka | F02C 9/28 700/289 |
| 2003/0192300 | A1 * | 10/2003 | Mahoney | F02C 9/263 60/39.281 |
| 2007/0220918 | A1 * | 9/2007 | Scharf | G05D 16/2013 62/656 |
| 2007/0245744 | A1 * | 10/2007 | Dooley | F01D 21/06 60/772 |
| 2008/0041063 | A1 | 2/2008 | Feiz | |
| 2009/0000302 | A1 * | 1/2009 | Edwards | F17D 1/04 60/698 |
| 2010/0018183 | A1 | 1/2010 | Feiz | |
| 2010/0101667 | A1 * | 4/2010 | Stokke | F17D 1/04 137/511 |
| 2010/0280731 | A1 * | 11/2010 | Snider | F02C 9/26 701/100 |
| 2010/0287945 | A1 * | 11/2010 | Liedtke | F02C 3/22 60/773 |
| 2011/0130941 | A1 * | 6/2011 | Szepek | F02C 7/22 701/100 |
| 2011/0203291 | A1 * | 8/2011 | Erickson | F02C 7/224 60/776 |
| 2011/0270502 | A1 * | 11/2011 | Demougeot | F02C 7/224 701/100 |
| 2012/0090331 | A1 * | 4/2012 | Bilton | F02C 3/22 60/776 |
| 2012/0234014 | A1 * | 9/2012 | Reuter | F02C 9/263 60/773 |
| 2013/0167935 | A1 * | 7/2013 | Lawson | F02C 7/22 137/1 |
| 2016/0047550 | A1 * | 2/2016 | McBrien | F02C 9/34 60/776 |

FOREIGN PATENT DOCUMENTS

| | | |
|---|---|---|
| EP | 0886054 A2 | 12/1998 |
| EP | 2256320 A2 | 12/2010 |
| GB | 2014758 A | 8/1979 |
| JP | S5956611 A | 4/1984 |
| JP | 2013044251 A | 3/2013 |
| JP | 2013241873 A | 12/2013 |
| WO | WO 03023208 A1 | 3/2003 |
| WO | WO-2012072614 A1 | 6/2012 |

OTHER PUBLICATIONS

Engineering ToolBox, (2003). Pipe Class Ratings and Pressure Nos. (PN). [online] Available at: https://www.engineeringtoolbox.com/flanges-pn-pressure-ratingsd_46.html [Accessed Oct. 4, 2018].*
Engineering ToolBox, (2006). PE Pipes—Pressure Grades. [online] Available at: https://www.engineeringtoolbox.com/pe-pressure-grades-d_668.html [Accessed Oct. 4, 2018].*
PipeFlow, "Cv and Kv Flow Coefficients", [Internet Archive: https://web.archive.org/web/20131012043853/https://www.pipeflow.com/public/PipeFlowExpertSoftwareHelp/desktop/Cv_and_Kv_Flow_Coefficients1.htm]. [Accessed on Apr. 23, 2019] (Year: 2013).*
Samson, "Kv Coefficient—Valve Sizing", Mar. 2012, https://www.samson.de [Accessed on Apr. 23, 2019]. (Year: 2012).*
Therm Excel, "Determination of Kv", [Internet Archive: https://web.archive.org/web/20121118234428/http://www.thermexcel.com:80/english/ressourc/valves.htm] [Accessed on Apr. 23, 2019] (Year: 2012).*
International Search Report PCT/ISA/210 for International Application No. PCT/CN2014/072246 dated Nov. 19, 2014.
Written Opinion of the International Searching Authority PCT/ISA/237 for International Application No. PCT/CN2014/072246 dated Nov. 19, 2014.
Extended European Search Report dated Sep. 25, 2017.

(56) References Cited

OTHER PUBLICATIONS

Office Action for European Patent Application No. 14883039.1 dated Oct. 8, 2019.

* cited by examiner

FUEL SUPPLY PIPELINE SYSTEM FOR GAS TURBINE

PRIORITY STATEMENT

This application is the national phase under 35 U.S.C. § 371 of PCT International Application No. PCT/CN2014/072246 which has an International filing date of Feb. 19, 2014, which designated the United States of America, the entire contents of which are hereby incorporated herein by reference.

FIELD

At least one embodiment of the present invention generally relates to a fuel supply pipeline system for a gas turbine. At least one embodiment of the present invention also generally relates to a gas turbine system having the fuel supply pipeline system.

BACKGROUND

A turbine, for instance a gas turbine (GT), is a motive power machine in which a continuously flowing fluid is used as a working medium to drive a turbine to rotate at high speed, and is widely used in many industrial fields, such as vehicle propulsion, power plants and the petrochemical field.

To supply gas to a gas turbine, a fuel supply system is generally provided to obtain gas, e.g. natural gas, from a gas source, in particular a gas network, and supply it to a combustion chamber of the gas turbine, in particular a burner in the combustion chamber. For example, the present applicant's WO 2012/072614 discloses a gas turbine system, the fuel supply system of which comprises a main fuel pipeline connected to a fuel network, and parallel fuel sections connected to a first fuel pipeline and a combustion chamber, wherein a first valve serving as a safety blocking device is disposed in the main fuel pipeline, and second and third valves serving as control valves are disposed in the parallel fuel sections respectively; the whole text thereof is incorporated herein by reference.

To enable safe operation of the fuel supply system, it is generally desired in the prior art that the pressure-bearing capability of all points, in particular weak points, of the entire fuel supply pipeline system be higher than a safe pressure; this safe pressure is greater than the maximum pressure to which the system is subjected. Although such a fuel supply system can ensure safe operation, all pipelines must be designed with a high pressure-bearing capability, causing costs to rise. Especially in the case of diverse gas sources having different pressures, such as a gas network, such a fuel supply system must compromise between the high cost of maintaining a high safety margin to adapt to a large number of fuel sources, and the low flexibility associated with setting a specific pressure-bearing capability for a specific fuel source.

SUMMARY

At least one embodiment of the present invention is intended to provide a fuel supply pipeline system for a gas turbine which ensures safe operation effectively in a simple manner.

At least one embodiment of the present invention provides a gas turbine system having the fuel supply pipeline system.

At least one embodiment of the present invention proposes a fuel supply pipeline system for a gas turbine, comprising: a control valve for controlling a gas conveyed to the gas turbine; a first pipeline for connecting a gas source to the control valve; a second pipeline for connecting the control valve to the gas turbine; a monitoring device, configured to determine an in-pipe pressure of the second pipeline at a position immediately after the control valve, i.e. adjacent to an outlet of the control valve; and a controller, configured to reduce an effective through-flow area of the control valve and preferably close the control valve when an in-pipe pressure determined in the second pipeline is greater than a predetermined in-pipe pressure. It will be understood that when the in-pipe pressure determined immediately after the control valve is greater than the predetermined in-pipe pressure, to complement or replace the closing of the control valve, an independent flow control mechanism may also be provided to close the second pipeline after the control valve or reduce the flow rate in the second pipeline; this falls within the scope of the present invention. In addition, it will be understood that the control valve according to an embodiment of the present invention will comprise any suitable flow regulating mechanism.

In an embodiment of the present invention, "immediately after the control valve or adjacent to the outlet of the control valve" has a clear meaning in engineering terms, and can be understood by those skilled in the art; for example, it is on the second pipeline, within a distance of about 9 times the nominal internal diameter of the second pipeline from the control valve outlet, preferably a distance of about 3 to 9 times the nominal internal diameter of the pipeline, preferably a distance of about 6 times the nominal internal diameter of the pipeline from the control valve outlet, and is advantageously after the control valve outlet, in a position where a maximum in-pipe pressure roughly occurs in the second pipeline.

According to another embodiment of the present invention, a gas turbine system is provided, comprising: a fuel supply pipeline system according to an embodiment of the present invention, and a gas turbine, having a combustion chamber, at least one burner located in the combustion chamber, an air supply mechanism for supplying compressed air to the combustion chamber, and a turbine in communication with the combustion chamber.

According to another embodiment of the present invention, a power generating apparatus is provided, comprising: a gas turbine system according to an embodiment of the present invention and a generator driven by the gas turbine system.

Some of the advantages and features of embodiments of the present invention can be understood by those skilled in the art by reading the embodiments of present invention; other advantages and features are explained in the particular embodiments below.

BRIEF DESCRIPTION OF THE DRAWINGS

The accompanying drawings set out below are merely intended to illustrate and explain embodiments of the present invention schematically, not to define the scope thereof, wherein.

Figure 1:
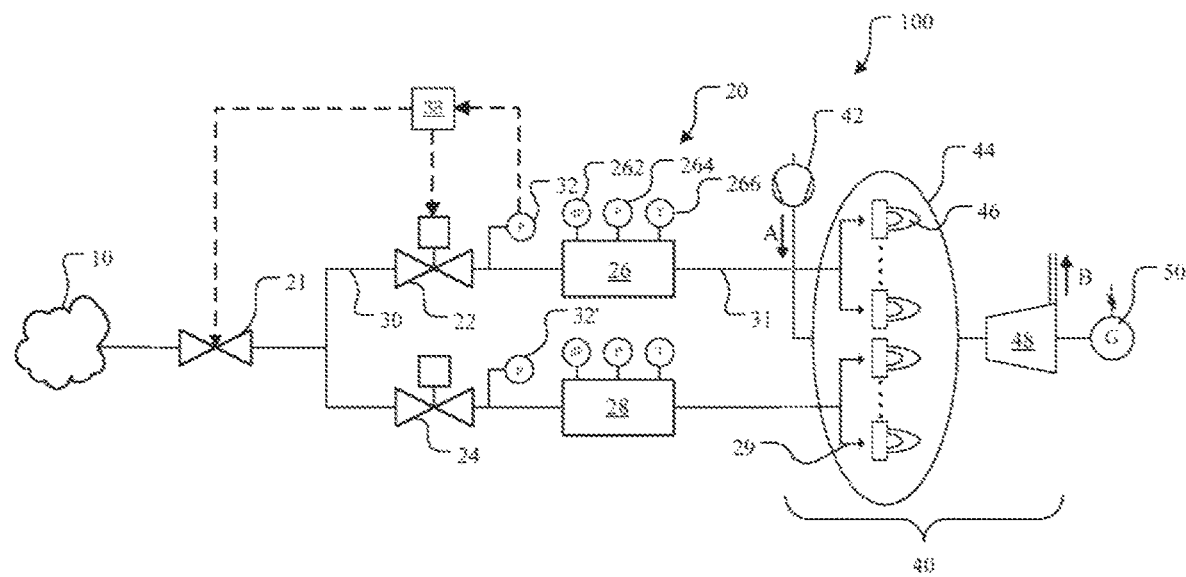
FIG. 1 shows schematically a first embodiment of the gas turbine system according to the present invention.

In the accompanying drawings, identical or similar drawing labels represent identical or similar features or elements.

LIST OF DRAWING LABELS

10—gas source; 20—fuel supply pipeline system; 21—blocking valve; 22—first control valve; 24—second control valve; 26—first flow meter; 28—second flow meter; 29—feed branch pipe; 30—first pipeline; 31—second pipeline; 31'—second pipeline part; 32—first pressure sensor; 32'—first pressure sensor; 34—second pressure sensor; 36—pressure difference sensor; 38—controller; 40—gas turbine; 42—compressor; 44—combustion chamber; 46—burner; 48—turbine; 50—generator; 100—gas turbine system; 262—gauge pressure sensor; 264—pressure sensor; 266—temperature sensor.

DETAILED DESCRIPTION OF THE EXAMPLE EMBODIMENTS

At least one embodiment of the present invention proposes a fuel supply pipeline system for a gas turbine, comprising: a control valve for controlling a gas conveyed to the gas turbine; a first pipeline for connecting a gas source to the control valve; a second pipeline for connecting the control valve to the gas turbine; a monitoring device, configured to determine an in-pipe pressure of the second pipeline at a position immediately after the control valve, i.e. adjacent to an outlet of the control valve; and a controller, configured to reduce an effective through-flow area of the control valve and preferably close the control valve when an in-pipe pressure determined in the second pipeline is greater than a predetermined in-pipe pressure. It will be understood that when the in-pipe pressure determined immediately after the control valve is greater than the predetermined in-pipe pressure, to complement or replace the closing of the control valve, an independent flow control mechanism may also be provided to close the second pipeline after the control valve or reduce the flow rate in the second pipeline; this falls within the scope of the present invention. In addition, it will be understood that the control valve according to an embodiment of the present invention will comprise any suitable flow regulating mechanism.

In an embodiment of the present invention, "immediately after the control valve or adjacent to the outlet of the control valve" has a clear meaning in engineering terms, and can be understood by those skilled in the art; for example, it is on the second pipeline, within a distance of about 9 times the nominal internal diameter of the second pipeline from the control valve outlet, preferably a distance of about 3 to 9 times the nominal internal diameter of the pipeline, preferably a distance of about 6 times the nominal internal diameter of the pipeline from the control valve outlet, and is advantageously after the control valve outlet, in a position where a maximum in-pipe pressure roughly occurs in the second pipeline.

Through the technical solution of at least one embodiment of the present invention, the overall capacity for safe operation of pipelines, in particular pipelines at weak parts, of the fuel supply pipeline system for a gas turbine can be maintained effectively in a simple manner.

For example, in at least one embodiment, the fuel supply pipeline system also comprises a blocking valve disposed upstream of the control valve, and the fuel supply pipeline system is configured to close the blocking valve when the determined in-pipe pressure is greater than a predetermined in-pipe pressure. More preferably, the fuel supply pipeline system comprises multiple said control valves connected in parallel, and the fuel supply pipeline system is configured to close all the control valves when an in-pipe pressure determined in the second pipeline adjacent to an outlet of any one of the control valves is greater than a predetermined in-pipe pressure. Especially preferably, the fuel supply pipeline system is configured to shut down when a determined in-pipe pressure is greater than a predetermined in-pipe pressure.

According to an example embodiment of the present invention, the first pipeline has a first pressure tolerance rating, sometimes also called "pressure rating", and the second pipeline has a second pressure tolerance rating that is less than the first pressure tolerance rating. Through the combination of the "differentiated" pressure tolerance rating pipeline arrangement and the in-pipe pressure monitoring according to at least one embodiment of the present invention, the pipelines before and after the control valve can be constructed in a "differentiated" manner according to corresponding core factors which influence design parameters of pipeline parts before and after the control valve, i.e. the pressure level of a gas source such as a gas network in the case of the first pipeline, and a gas turbine drive power in the case of the second pipeline; in particular, suitable pipeline pressure tolerance ratings can be designed individually, so as to obtain a better cost benefit by means of a second pipeline with a low pressure tolerance rating and a longer length, and at the same time ensure, by monitoring the second pipeline with the weak pressure rating by means of a pressure monitoring means, safe operation of the weak second pipeline and in turn the entire fuel supply pipeline system at all times. Compared with the prior art, the system of the present invention brings higher cost savings, is more flexible, is better able to adapt to gas networks having different pressure ratings, and can still operate safely.

According to another example embodiment of the present invention, the predetermined in-pipe pressure is determined on the basis of the second pressure tolerance rating and is less than or equal to the second pressure tolerance rating.

According to an example embodiment of the present invention, the first pressure tolerance rating is greater than or equal to PN63, while the second pressure tolerance rating is less than or equal to PN50 and greater than or equal to PN20.

According to an embodiment of the present invention, the monitoring device comprises a first pressure sensor disposed on the second pipeline in a position adjacent to an outlet of the control valve, to enable simple determination of whether an in-pipe pressure immediately after the control valve exceeds a maximum permitted operating pressure of the second pipeline.

According to another embodiment of the present invention, the monitoring device comprises a calculating unit and a second pressure sensor disposed in the first pipeline, the calculating unit being configured to calculate a determined in-pipe pressure on the basis of a measured pressure of the second pressure sensor and a pressure drop through the control valve, so that a pressure sensor need not be provided separately at the control valve outlet.

According to another example embodiment, the monitoring device also comprises a pressure difference sensor mounted on the control valve, for detecting a pressure drop or a pressure loss through the control valve; this provides a simple means for determining the pressure drop through the control valve.

According to another example embodiment, the monitoring device is configured to detect a degree of opening of the control valve, and the calculating unit is configured to determine a pressure drop through the control valve according to the degree of opening of the control valve; this provides a simple, low-cost means for determining the pressure drop through the control valve, and eliminates the pressure difference sensor.

Preferably, in order to enable accurate determination of a pressure drop or pressure loss through the control valve, the calculating unit is configured to determine the pressure drop or pressure loss through the control valve by the following formula but without limitation to the following formula, on the basis of a classical fluid mechanics control valve pressure drop calculation formula:

$$\dot{m} = Kv\_CV \times 110 \times P0 \times \left(1 - \frac{\frac{dp\_CV}{P0}}{3 \times \frac{k}{1.4} \times X_T}\right) \times Fp \times \sqrt{\frac{T0 \times Z}{\frac{dp\_CV}{P0} \times M}}$$

Where:
P0=pressure detected by second pressure sensor,
dp_CV=pressure drop,
Kv_CV=flow coefficient corresponding to degree of opening of control valve,
T0=temperature value of fluid, such as gas, in pipe,
$\dot{m}$=mass flow rate value
M=molar mass of fluid, such as gas, in pipe,
k=adiabatic index of fluid, such as gas, in pipeline,
$X_T$=pressure difference ratio parameter of control valve,
$F_p$=pipeline arrangement influence factor,
Z=compressibility factor of fluid, such as gas, in pipeline,
  wherein T0, $\dot{m}$, M, k, $X_T$, $F_p$ and Z are constants or can be determined by those skilled in the art.

According to another example embodiment, a flow meter having a pressure sensor is also disposed in the second pipeline, the monitoring device comprises a calculating unit configured to calculate a determined in-pipe pressure on the basis of a measured pressure of the pressure sensor of the flow meter and a pressure loss or pressure drop of a second pipeline part between an outlet of the control valve and the flow meter; this makes full use of a conventional device, i.e. the flow meter, which is generally provided in a pipeline system, thus the pressure sensor disposed separately at the control valve outlet can be eliminated. Moreover, the inventors have found that although the flow meter is separated from the control valve outlet by a certain distance, the in-pipe pressure in the second pipeline adjacent to the control valve outlet can still be determined effectively by means of the calculating unit and the pressure sensor in the flow meter.

Preferably, the pressure drop of the second pipeline part is a pressure drop of the second pipeline part determined on the basis of a maximum permitted pressure of the second pipeline; this provides a simple means of determining the pressure drop of the second pipeline part.

As an alternative, in order to enable more accurate determination of the pressure drop of the second pipeline part, the pressure drop of the second pipeline part is calculated on the basis of the following formula:

$$dp\_PIPE = \frac{1}{p3} \times \left[ \dot{m}^2 \times \frac{T0}{\rho_N} \times \left(\frac{3600}{514}\right)^2 \times \left(\frac{1}{k_v}\right)^2 \right]$$

Where:
dp_PIPE=pressure drop of the second pipeline part,
P3=pressure measurement value detected by pressure sensor of flow meter,
$k_v$=pipeline flow coefficient, which characterizes through-flow capacity, and in general is known or can be determined by those skilled in the art,
T0=temperature value of fluid, such as gas, in pipeline,
$\dot{m}$=mass flow rate value,
$\rho_N$=standard density,
where kv, T0, $\dot{m}$ and $\rho_N$ are constants or can be determined by those skilled in the art.

According to another embodiment of the present invention, a gas turbine system is provided, comprising: a fuel supply pipeline system according to an embodiment of the present invention, and a gas turbine, having a combustion chamber, at least one burner located in the combustion chamber, an air supply mechanism for supplying compressed air to the combustion chamber, and a turbine in communication with the combustion chamber.

According to another embodiment of the present invention, a power generating apparatus is provided, comprising: a gas turbine system according to an embodiment of the present invention and a generator driven by the gas turbine system.

Embodiments of the system and device of the present invention are now described with reference to the following particular embodiments and the accompanying drawings. Although the drawings are provided to present some embodiments of the present invention, the drawings are not necessarily drawn in accordance with the dimensions of specific features in the embodiments; certain features may be enlarged, removed or sectioned, to better illustrate embodiments of the present invention.

Referring to FIG. 1, this shows an embodiment of a gas turbine system 100 according to an embedment of the present invention. The gas turbine system 100 comprises a fuel supply pipeline system 20 and a gas turbine (GT) 40. The fuel supply pipeline system 20 is connected to a gas source 10, such as a gas network, in particular a natural gas network, and supplies gas to the gas turbine 40 in a controllable fashion. The gas turbine 40 comprises an air supply mechanism for supplying air, a combustion chamber (CC) 44, multiple burners 46 located in the combustion chamber 44 and a turbine 48 or turbine vane wheel. The air supply mechanism preferably comprises a compressor 42 to supply compressed air to the combustion chamber 44 along arrow A as shown in the figure. The burners 46 in the combustion chamber 44 are connected to the fuel supply pipeline system 20, so as to generate hot gas through combustion of gas in compressed air to push the turbine 48 to rotate, and exhaust gases are discharged along arrow B as shown schematically in the figure. In the embodiment shown, the gas turbine system 100 is part of a power generating apparatus, so that the gas turbine 40, in particular the turbine 48, drives a generator 50, to generate electric power. However, it should be apparent that the gas turbine system 100 according to an embodiment of the present invention can suit any suitable application, without departing from the scope of the present invention. It should also be apparent that the fuel supply pipeline system 20 according to an embodiment of the present invention can suit gas turbines having other configurations or compositions, without departing from the scope of the present invention.

Continuing to refer to FIG. 1, the fuel supply pipeline system 20 according to an embodiment of the present invention is now described further; it comprises a main pipeline connected to a gas source 10 and multiple (two as shown in the figure) parallel secondary pipelines connected to the main pipeline, with a control valve disposed in each secondary pipeline, i.e. first and second control valves 22 and 24, for controlling the amount of fuel supplied to the burners 46. Although there are two parallel secondary pipelines in the embodiment shown, and in turn two control valves 22 and 24, it will be apparent that there may be just one control valve (i.e. without parallel pipelines) or more than two control valves; all this falls within the scope of the present invention. In order to describe the inventive thinking, in this text the pipeline upstream of the control valves 22 and 24 are called first pipelines 30, while the downstream pipelines are called second pipelines 31.

Thus, in the embodiment shown, the respective first pipelines 30 upstream of the control valves 22 and 24 comprise the common main pipeline and those parts of the respective secondary pipelines which are located upstream of the control valves 22 and 24. As shown in the figure, downstream of the control valves 22 and 24, i.e. in the second pipelines 31, there may in particular be no further flow control or regulating mechanism.

In the embodiment shown, a blocking valve 21 or any suitable safety blocking device is disposed in the main pipeline, i.e. in the first pipelines upstream of all the control valves 22 and 24. A compressor (not shown in the figure) may also preferably be disposed upstream of the blocking valve 21 or located between the gas source 10 and the fuel supply pipeline system 20, for increasing gas pressure for example when the gas turbine is activated.

First and second flow meters 26 and 28 may also preferably be disposed in the respective second pipelines 31 downstream of the first and second control valves 22 and 24. The flow meters 26 and 28 may be any suitable conventional flow meters, and in the embodiment shown, the flow meters preferably may comprise a gauge pressure sensor 262, a pressure sensor 264 and a temperature sensor 266. The second pipelines 31 may comprise multiple feed branch pipes 29 which extend in parallel downstream of the flow meters 26 and 28; each feed branch pipe 29 may be connected to a burner 46. In the embodiment shown, each second pipeline 31 may comprise 24 feed branch pipes 29, which in turn may be connected to e.g. 24 burners 46 which are uniformly distributed in the combustion chamber 44.

Still referring to FIG. 1, the combination of the "differentiated" pressure tolerance rating pipeline arrangement and the in-pipe pressure monitoring i.e. maximum operating pressure (MOP) monitoring according to the present invention is described.

In the embodiment shown, the first pipeline 30 may comprise a pipeline having a first pressure tolerance rating or a first pressure rating and is preferably formed therefrom, while the second pipeline 31 may comprise a pipeline having a second pressure tolerance rating or a second pressure rating and is preferably formed therefrom, the first pressure tolerance rating being greater than the second pressure tolerance rating. In an embodiment according to the present invention, the first pressure tolerance rating is for example greater than PN63, preferably greater than or equal to PN63 and less than or equal to PN250, more preferably greater than or equal to PN63 and less than or equal to PN150. The second pressure tolerance rating is for example less than or equal to PN50, preferably less than or equal to PN50 and less than or equal to PN20, and preferably less than or equal to PN40 and greater than or equal to PN20.

The fuel supply pipeline system 20 may also comprise at least one first pressure sensor 32, 32' immediately downstream of each control valve 22, 24; for example, in one embodiment, there are three first pressure sensors which act as a monitoring device. The fuel supply pipeline system 20 also comprises a controller 38. The first pressure sensor 32, 32' is configured to detect an in-pipe pressure in the second pipeline 31 at an outlet of the control valve 22, 24. The first pressure sensor is preferably an absolute pressure sensor.

The controller 38 may be configured to be able to obtain a pressure measured by the first pressure sensor 32, 32' (the figure only shows the pressure measured by the first pressure sensor 32 being obtained). For instance, if the control valve and/or 24 is unwittingly opened such that the in-pipe pressure determined in the second pipeline downstream of either control valve is greater than a predetermined in-pipe pressure, the controller 38 can reduce or close the effective through-flow area of the corresponding control valve, or preferably close some, preferably all, of the control valves connected in parallel, and/or close the blocking valve, and more preferably shut down the fuel supply pipeline system 20 and in turn the entire gas turbine system 100, in which case all the control valves 22, 24 and the blocking valve 21 are closed. In the embodiment shown, the predetermined in-pipe pressure is determined on the basis of the second pressure rating, and is less than or equal to the second pressure rating. Preferably, the predetermined in-pipe pressure is the second pressure rating minus a fixed or variable safety margin.

Through the combination of the "differentiated" pressure tolerance rating pipeline arrangement and the in-pipe pressure monitoring according to an embodiment of the present invention, a first pipeline that is located upstream of the control valve and has a relatively high pressure rating may be selected to enable the pipeline system 20 of an embodiment of the present invention to suit gas sources with a variety of pressure levels, in particular gas networks, wherein the pressure levels of different gas networks, as those skilled in the art know, are generally not user-controlled, but vary depending on the gas supplier and the municipal gas network configuration. At the same time, a second pipeline that is located downstream of the control valve and has a lower pressure rating can be selected on the basis of a specific gas turbine power.

In addition, by means of the in-pipe pressure monitoring means adjacent to the control valve, a safe operating pressure of the second pipeline is determined on the basis of the lower pressure rating of the second pipeline. Thus, the pipeline parts before and after the control valve can be constructed independently in a "differentiated" manner on the basis of their respective core influencing factors, so as to obtain a better cost benefit by means of a second pipeline with a low pressure rating and a longer length, and at the same time ensure, by means of the pressure monitoring means, safe operation of the entire fuel supply pipeline system at all times. Compared with the prior art, the system of the present invention brings higher cost savings, is more flexible, is better able to adapt to gas networks having different pressure ratings, and can still operate safely.

To complement or replace the monitoring device according to an embodiment of the present invention as shown in FIG. 1, FIGS. 2-4 show embodiments of other in-pipe pressure monitoring means according to the present invention.

Figure 2:
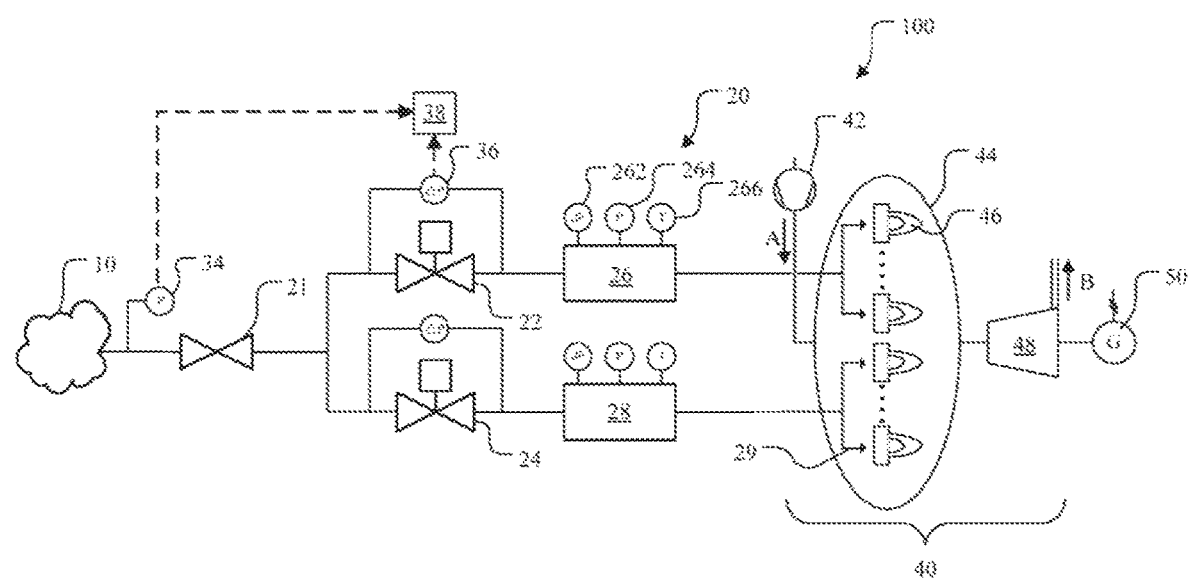
FIG. 2 shows schematically a second embodiment of the gas turbine system according to the present invention.

The embodiment shown in FIG. 2 is substantially similar to the embodiment shown in FIG. 1, except for the fact that in the embodiment shown in FIG. 2, first pressure sensors 32, 32' are not disposed at the outlets of the control valves 22, 24. In comparison, the monitoring device of this embodiment comprises at least one second pressure sensor 34 located in the first pipeline 30, in particular located upstream of the blocking valve 21, for example three second pressure sensors, and pressure difference sensors 36 mounted on the control valves 22, 24. It will be understood that the second pressure sensor 34 may be a pressure sensor that is specially designed to perform in-pipe pressure monitoring according to the present invention, or may be a pressure sensor that is conventionally arranged in the main pipeline; the latter reduces the cost of the pipeline system. Likewise, the pressure difference sensor 36 may be a pressure difference sensor carried by the control valve 22, 24 itself.

In this embodiment, the in-pipe pressure of the second pipeline immediately downstream of the control valve 22, 24 can be calculated from the following formula, for example by a calculating unit which is independent or, as shown in the figure, integrated in the controller 38:

$$P = P0 - dp\_CV;$$

Where:
P=the in-pipe pressure determined,
P0=the pressure measurement value detected by the second pressure sensor,
dp_CV=the pressure drop or pressure loss detected by the pressure difference sensor.

In one embodiment, a pressure drop through the blocking valve 21 may also be taken into account. However, in a preferred embodiment, the pressure drop through the blocking valve is not taken into account, in order to provide a further safety margin.

Figure 3:
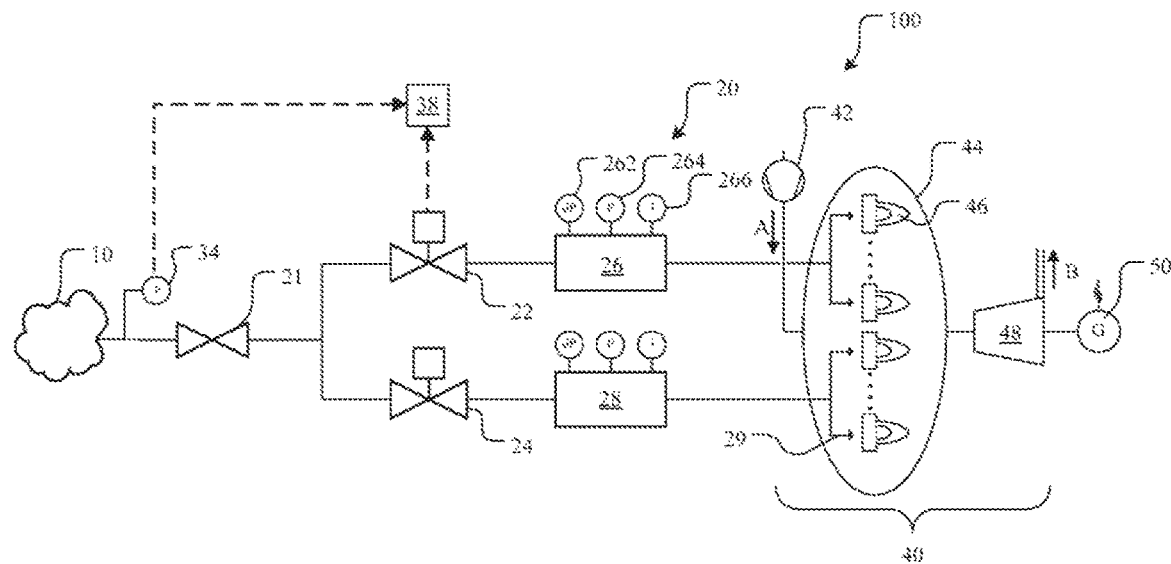
FIG. 3 shows schematically a third embodiment of the gas turbine system according to the present invention.

In another embodiment shown in FIG. 3, the monitoring device may not be provided with pressure difference sensors through the control valves 22, 24; the controller 38 can detect the degree of opening of each control valve 22, 24 (the figure only shows the degree of opening of the control valve 22 being detected), and determine the pressure drop or pressure loss through the control valve 22, 24 on the basis of the degree of opening of the control valve 22, 24.

More preferably, the pressure drop or pressure loss through the control valve 22, 24 can be calculated from the following formula by a calculating unit:

$$\dot{m} = \mathrm{Kv\_CV} \times 110 \times P0 \times \left(1 - \frac{\frac{dp\_CV}{P0}}{3 \times \frac{k}{1.4} \times X_T}\right) \times Fp \times \sqrt{\frac{T0 \times Z}{\frac{dp\_CV}{P0} \times M}}$$

where:
P0=pressure detected by the second pressure sensor,
dp_CV=pressure drop,
Kv_CV=flow coefficient corresponding to degree of opening of control valve,
T0=temperature value of fluid, such as gas, in pipe,
$\dot{m}$=mass flow rate value
M=molar mass of fluid, such as gas, in pipe,
k=adiabatic index of fluid, such as gas, in pipe,
$X_T$=pressure difference ratio parameter of control valve,
$F_p$=pipeline arrangement influence factor,
Z=compressibility factor of fluid, such as gas, in pipe,
wherein T0, $\dot{m}$, M, k, $X_T$, $F_p$ and Z are constants or can be determined by those skilled in the art.

Figure 4:
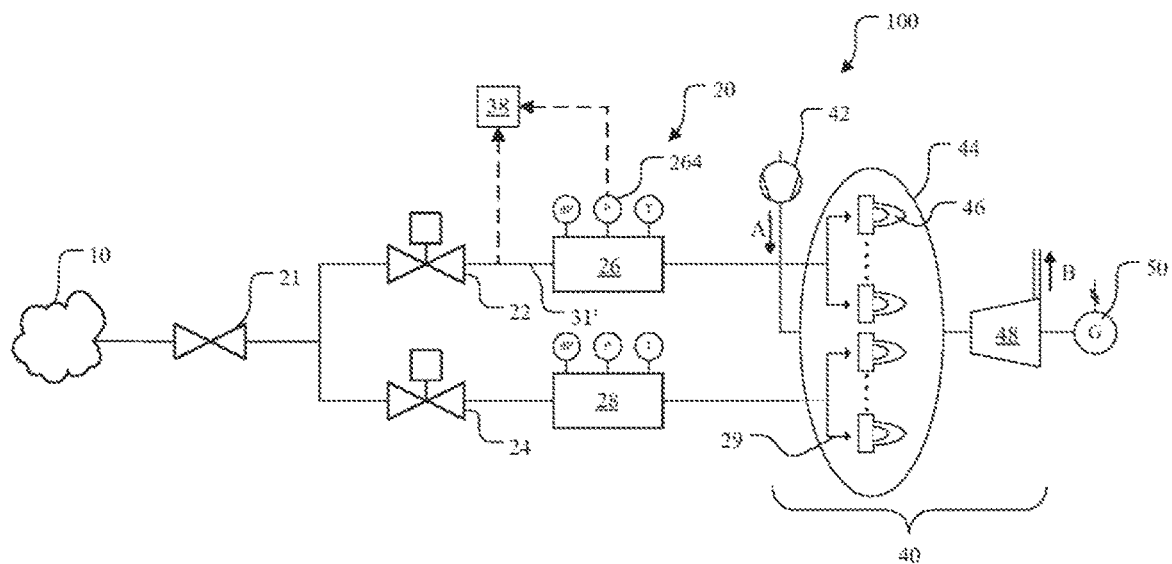
FIG. 4 shows schematically a fourth embodiment of the gas turbine system according to the present invention.

In another embodiment shown in FIG. 4, the pressure sensors 264 of the existing flow meters 26, 28 are used to calculate the in-pipe pressure of the second pipelines downstream of the control valves 22, 24. A calculating unit may be configured to determine the in-pipe pressure on the basis of the measured pressure of the pressure sensor 264 of the flow meter 26, 28 and the pressure drop of a second pipeline part 31' between the outlet of the control valve 22, 24 and the flow meter 26, 28. The inventors have found that although the flow meter 26, 28 is separated from the control valve 22, 24 by a certain distance, the pressure wave speed is sufficiently fast to enable an in-pipe pressure signal to be obtained in a timely manner from the pressure sensor of the flow meter 26, 28 so as to close the control valve and blocking valve or shut down the pipeline system.

Preferably, the in-pipe pressure of the second pipeline immediately downstream of the control valve 22, 24 is determined on the basis of the following formula:

$$P = P3 - dp\_\mathrm{PIPE\text{-}max};$$

Where:
P=the in-pipe pressure determined,
P3=the pressure measurement value detected by the pressure sensor of the flow meter,
dp_PIPE-max=pressure drop or pressure loss of the second pipeline part determined on the basis of the maximum permitted pressure of the second pipeline.

Thus, in the in-pipe pressure monitoring, the pressure drop or pressure loss of the second pipeline part 31' is set to be a fixed value, i.e. the maximum pressure loss mentioned above. However, in an alternative embodiment, the in-pipe pressure may be determined on the basis of a dynamic pressure drop or pressure loss of the second pipeline part. For example, the in-pipe pressure of the second pipeline immediately downstream of the control valve 22, 24 is determined on the basis of the following formula:

$$P = P3 - dp\_\mathrm{PIPE};$$

Where:
P=the in-pipe pressure determined,
P3=the pressure measurement value detected by the pressure sensor of the flow meter,
dp_PIPE=the dynamic pressure drop or pressure loss of the second pipeline part.

The dynamic pressure drop or pressure loss of the second pipeline part is determined on the basis of the following formula:

$$dp\_\mathrm{PIPE} = \frac{1}{p3} \times \left[\dot{m}^2 \times \frac{T0}{\rho_N} \times \left(\frac{3600}{514}\right)^2 \times \left(\frac{1}{k_v}\right)^2\right]$$

where:
dp_PIPE=the dynamic pressure drop or pressure loss of the second pipeline part,
P3=the pressure measurement value detected by the pressure sensor of the flow meter,
$k_v$=pipeline flow coefficient, which characterizes through-flow capacity, and in general is known or can be determined by those skilled in the art,
T0=temperature value of fluid in pipeline,
$\dot{m}$=mass flow rate measurement value,
$\rho_N$=standard density,
where kv, T0, $\dot{m}$ and $\rho_N$ are constants or can be determined by those skilled in the art.

Although it is not schematically shown in FIGS. 2-4 that the controller 38 controls the control valves 22, 24 and the blocking valve 21 to close, it will be understood that the controller 38 controls the control valves 22, 24 and the blocking valve 21 to close as in the embodiment shown in FIG. 1.

In addition, although the calculating unit is integrated in the controller 38 in the embodiments shown in FIGS. 2-4, those skilled in the art will understand that an independent calculating unit could be provided.

Preferred embodiments of the present invention are described above. It should be understood that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the various embodiments could also be suitably combined to form other embodiments capable of being understood by those skilled in the art. In particular, the various embodiments above could for example be combined so as to obtain multiple determined in-pipe pressures or maximum operating pressures, and the control valve and/or blocking valve could be closed and/or the pipeline system could be shut down when any determined in-pipe pressure is greater than a predetermined in-pipe pressure.

The above embodiments are merely particular schematic embodiments of the present invention, which are not intended to define the scope thereof. Any equivalent changes, modifications or combinations made by those skilled in the art without departing from the concept and principles of the present invention should be included in the scope of protection thereof.

The invention claimed is:

1. A fuel supply pipeline system for a gas turbine, comprising:
   a control valve to control a gas conveyed to the gas turbine;
   a first pipeline to connect a gas source to the control valve;
   a second pipeline to connect the control valve to the gas turbine;
   a monitor directly connected to the second pipeline downstream of the control valve in a gas flow direction, the monitor being configured to determine an in-pipe pressure of the second pipeline at a position adjacent to an outlet of the control valve; and
   a controller, configured to reduce an effective throughflow area of the control valve or close the control valve when the in-pipe pressure determined in the second pipeline is greater than a threshold in-pipe pressure, wherein the first pipeline includes a first pressure tolerance rating, and the second pipeline includes a second pressure tolerance rating, less than the first pressure tolerance rating, wherein
      the monitor comprises a calculator and a second pressure sensor disposed in the first pipeline, the calculator being configured to calculate the determined in-pipe pressure of the second pipeline on the basis of a pressure measured by the second pressure sensor and a pressure drop through the control valve,
      the monitor is configured to detect a degree of opening of the control valve, and wherein the calculator is configured to determine a pressure drop through the control valve according to the degree of opening of the control valve, and
      the calculator is configured to determine the pressure drop through the control valve on the basis of the following formula:

$$\dot{m} = Kv\_CV \times 110 \times P0 \times \left(1 - \frac{\frac{dp\_CV}{P0}}{3 \times \frac{k}{1.4} \times X_T}\right) \times Fp \times \sqrt{\frac{T0 \times Z}{\frac{dp\_CV}{P0} \times M}}$$

where P0=pressure detected by second pressure sensor,
dp_CV=pressure drop,
Kv_CV=flow coefficient corresponding to degree of opening of control valve,
T0=temperature value of gas in pipe,
$\dot{m}$=mass flow rate value
M=molar mass of gas in pipe,
k=adiabatic index of gas in pipe,
$X_T$=pressure difference ratio parameter of control valve,
$F_p$=pipeline arrangement influence factor,
Z=compressibility factor of gas in pipe.

2. The fuel supply pipeline system of claim 1, further comprising:
   a blocking valve, disposed upstream of the control valve, the controller being configured to close the blocking valve when the determined in-pipe pressure is greater than the threshold in-pipe pressure.

3. The fuel supply pipeline system of claim 2, wherein a flow meter including a pressure sensor is disposed in the second pipeline, the monitor comprises a calculator configured to calculate the in-pipe pressure of the second pipeline on the basis of a pressure measured by the pressure sensor of the flow meter and a measured pressure drop of a second pipeline part between an outlet of the control valve and the flow meter.

4. The fuel supply pipeline system of claim 3, wherein the pressure drop of the second pipeline part is a pressure drop of the second pipeline part determined on the basis of a maximum pressure rating of the second pipeline.

5. The fuel supply pipeline system of 3, wherein the measured pressure drop of the second pipeline part is calculated on the basis of the following formula:

$$dp\_PIPE = \frac{1}{p3} \times \left[\dot{m}^2 \times \frac{T0}{\rho_N} \times \left(\frac{3600}{514}\right)^2 \times \left(\frac{1}{k_v}\right)^2\right]$$

where dp_PIPE=pressure drop of the second pipeline part,
P3=pressure measurement value detected by pressure sensor of flow meter,
kv=pipeline flow coefficient,
T0=temperature value of gas in pipe,
$\dot{m}$=mass flow rate value,
$\rho_N$=standard density.

6. A gas turbine system, comprising:
   the fuel supply pipeline system of claim 2, and a gas turbine including:
   a combustion chamber;
   at least one burner located in the combustion chamber;
   an air supplier to supply compressed air to the combustion chamber; and
   a turbine in communication with the combustion chamber.

7. The fuel supply pipeline system of claim 1, wherein the control valve is one of multiple control valves connected in parallel, the controller being configured to close all the multiple control valves when the in-pipe pressure determined in the second pipeline adjacent to an outlet of any one of the multiple control valves is greater than the threshold in-pipe pressure.

8. A gas turbine system, comprising:
the fuel supply pipeline system of claim 7, and a gas turbine including:
a combustion chamber;
at least one burner located in the combustion chamber;
an air supplier to supply compressed air to the combustion chamber; and
a turbine in communication with the combustion chamber.

9. The fuel supply pipeline system of claim 1, wherein the controller is configured to shut down the fuel supply pipeline system when the determined in-pipe pressure is greater than the threshold in-pipe pressure.

10. The fuel supply pipeline system of claim 1, wherein the threshold in-pipe pressure is determined on the basis of the second pressure tolerance rating and is less than or equal to the second pressure tolerance rating.

11. The fuel supply pipeline system of claim 1, wherein the first pressure tolerance rating is greater than or equal to PN63, while the second pressure tolerance rating is less than or equal to PN50 and greater than or equal to PN20.

12. The fuel supply pipeline system of claim 1, wherein the monitor comprises a first pressure sensor disposed on the second pipeline in a position adjacent to the outlet of the control valve.

13. The fuel supply pipeline system of claim 1, wherein the monitor also comprises a pressure difference sensor mounted on the control valve, to determine a pressure drop through the control valve.

14. The fuel supply pipeline system of claim 1, wherein a flow meter including a pressure sensor is disposed in the second pipeline, the monitor comprises a calculator configured to calculate the in-pipe pressure of the second pipeline on the basis of a pressure measured by the pressure sensor of the flow meter and a measured pressure drop of a second pipeline part between the outlet of the control valve and the flow meter.

15. The fuel supply pipeline system of claim 14, wherein the measured pressure drop of the second pipeline part is a pressure drop of the second pipeline part determined on the basis of a maximum permitted pressure of the second pipeline.

16. The fuel supply pipeline system of 14, wherein the measured pressure drop of the second pipeline part is calculated on the basis of the following formula:

$$dp\_PIPE = \frac{1}{p3} \times \left[ \dot{m}^2 \times \frac{T0}{\rho_N} \times \left(\frac{3600}{514}\right)^2 \times \left(\frac{1}{k_v}\right)^2 \right]$$

where dp_PIPE=pressure drop of the second pipeline part,
P3=pressure measurement value detected by pressure sensor of flow meter,
kv=pipeline flow coefficient,
T0=temperature value of gas in pipe,
$\dot{m}$=mass flow rate value,
$\rho_N$=standard density.

17. A gas turbine system, comprising:
the fuel supply pipeline system of claim 1, and a gas turbine including:
a combustion chamber;
at least one burner located in the combustion chamber;
an air supplier to supply compressed air to the combustion chamber; and
a turbine in communication with the combustion chamber.

* * * * *